United States Patent
Jenkins et al.

(10) Patent No.: US 10,799,970 B2
(45) Date of Patent: Oct. 13, 2020

(54) ROTARY CLEANING TOOL

(71) Applicant: Raytheon Company, Waltham, MA (US)

(72) Inventors: Decari Jenkins, Tucson, AZ (US); Keith E. Lane, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 43 days.

(21) Appl. No.: 16/115,309

(22) Filed: Aug. 28, 2018

(65) Prior Publication Data

US 2020/0070268 A1 Mar. 5, 2020

(51) Int. Cl.
| | | |
|---|---|---|
| *B23G 9/00* | (2006.01) | |
| *A46B 13/00* | (2006.01) | |
| *A46B 13/02* | (2006.01) | |
| *A46B 5/00* | (2006.01) | |
| *B08B 1/00* | (2006.01) | |
| *B08B 1/04* | (2006.01) | |

(52) U.S. Cl.
CPC ............ *B23G 9/009* (2013.01); *A46B 5/0095* (2013.01); *A46B 13/003* (2013.01); *A46B 13/02* (2013.01); *A46B 2200/3093* (2013.01); *B08B 1/002* (2013.01); *B08B 1/04* (2013.01)

(58) Field of Classification Search
CPC ..... B23G 9/009; A46B 5/0095; A46B 13/003; A46B 13/02; A46B 2200/3093; B08B 1/002; B08B 1/04
See application file for complete search history.

(56) References Cited

U.S. PATENT DOCUMENTS

| | | | |
|---|---|---|---|
| 2,225,272 A | 12/1940 | Horne | |
| 2,404,507 A | 7/1946 | Link | |
| 3,188,674 A | 6/1965 | Hobbs | |
| 4,372,003 A * | 2/1983 | Toelke | ................... B08B 9/021 15/104.04 |

(Continued)

FOREIGN PATENT DOCUMENTS

| | | |
|---|---|---|
| CN | 202288178 U | 7/2012 |
| DE | 4037944 A1 | 6/1992 |

(Continued)

OTHER PUBLICATIONS

WO-9737781-A1—English machine translation (Year: 1997).*

(Continued)

*Primary Examiner* — Marc Carlson

(57) ABSTRACT

A cleaning tool is disclosed for cleaning an object (e.g., a threaded fastener) and retaining debris from cleaning the object. The cleaning tool can comprise a housing operable to be rotated by hand or by a hand tool, and a cleaning chamber formed through the housing. A plurality of retaining cavities are formed through the housing and in fluid communication with the cleaning chamber, and a plurality of cleaning elements (e.g., shafts having bristles) are supported by respective retaining cavities, such that a portion of the cleaning elements (e.g., wire bristles) extend into the cleaning chamber for cleaning the object upon rotation of the housing relative to the object. Elastic elements can be supported by the housing for biasing the cleaning elements to accommodate cleaning different sizes of objects. Associated systems and methods are provided.

25 Claims, 7 Drawing Sheets

(56) References Cited

U.S. PATENT DOCUMENTS

| | | | |
|---|---|---|---|
| 5,168,660 A | | 12/1992 | Smith |
| 5,309,490 A | | 5/1994 | Bayersten |
| 5,451,124 A | | 9/1995 | Meigs |
| 5,946,757 A | | 9/1999 | Oliveira |
| 6,553,601 B1 | | 4/2003 | Major |
| 8,032,970 B2 | | 10/2011 | Chen |
| D706,998 S | | 6/2014 | Anderson |
| 9,216,439 B2 | | 12/2015 | Le Blanc |
| D782,757 S | | 3/2017 | Anderson |
| 9,974,382 B2 | * | 5/2018 | Lin ................. A46B 13/001 |
| 2004/0003476 A1 | * | 1/2004 | Bierria ............. A46B 13/001 15/88 |
| 2004/0031112 A1 | * | 2/2004 | Saurer ............. A46B 13/001 15/88 |
| 2004/0216254 A1 | * | 11/2004 | Ueberall ............. B08B 1/008 15/104.04 |
| 2006/0112506 A1 | | 6/2006 | Smart et al. |
| 2009/0038090 A1 | | 2/2009 | Beck et al. |
| 2009/0094767 A1 | * | 4/2009 | De Leon ............. B08B 1/00 15/106 |
| 2010/0263145 A1 | * | 10/2010 | Chen ............. A46B 5/0095 15/160 |
| 2011/0005012 A1 | * | 1/2011 | Le Blanc ............. A46B 13/001 15/21.1 |
| 2012/0186032 A1 | | 7/2012 | Donohue et al. |
| 2015/0231715 A1 | * | 8/2015 | Taylor ............. B23G 9/009 134/6 |
| 2015/0335143 A1 | * | 11/2015 | Edmond ............. B08B 9/027 15/88 |
| 2017/0273449 A1 | * | 9/2017 | Lin ................. A46B 13/001 |
| 2018/0271266 A1 | * | 9/2018 | Lin ................. A46B 3/18 |

FOREIGN PATENT DOCUMENTS

| | | | |
|---|---|---|---|
| DE | 9313723 U1 | 11/1993 | |
| EP | 0732155 A1 * | 9/1996 | ............. B23G 9/009 |
| EP | 0732155 A1 | 9/1996 | |
| EP | 3250144 A1 | 12/2017 | |
| JP | 57050559 A | 3/1982 | |
| WO | WO 90/05596 A1 | 5/1990 | |
| WO | WO 97/37781 A1 | 10/1997 | |
| WO | WO-9737781 A1 * | 10/1997 | ............... B08B 1/04 |

OTHER PUBLICATIONS

CCJ Staff, Tru-Balance offers wheel stud cleaning brush, https://www.ccjdigital.com/tru-balance-offers-wheel-stud-cleaning-brush/, Aug. 15, 2011, 3 pages, CCJ Commerical Carrier Journal, Tuscaloosa, Alabama.

Counteract, Counteract Stud Cleaning Tool, https://www.counteractbalancing.com/products/stud-brush/, to the best of the applicant's knowledge article was available before the application filing date, 3 pages, Counteract, Canada.

Shipman Industries, Industrial Bolt & Pipe Cleaner, to the best of the applicant's knowledge article was available before the application filing date, 3 pages, Shipman Industries, Oklahoma City, OK.

Tru-Balance, Tools, https://www.tru-bal.com/tools, to the best of the applicant's knowledge article was available before the application filed, 4 pages, Tru-Balance Wheel Centering Products, Windsor, CO.

International Search Report for International Application No. PCT/US2019/039987 dated Oct. 29, 2019, 15 pages.

* cited by examiner

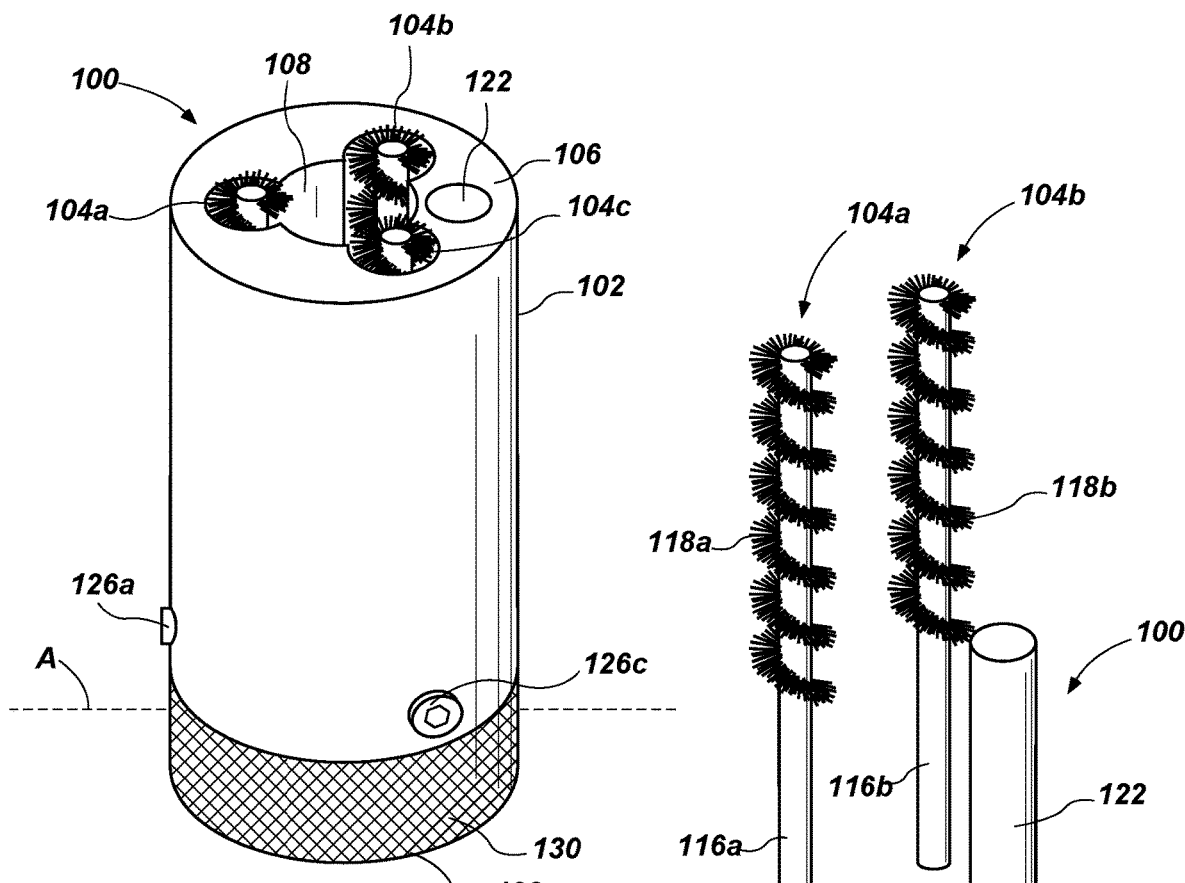
FIG. 1
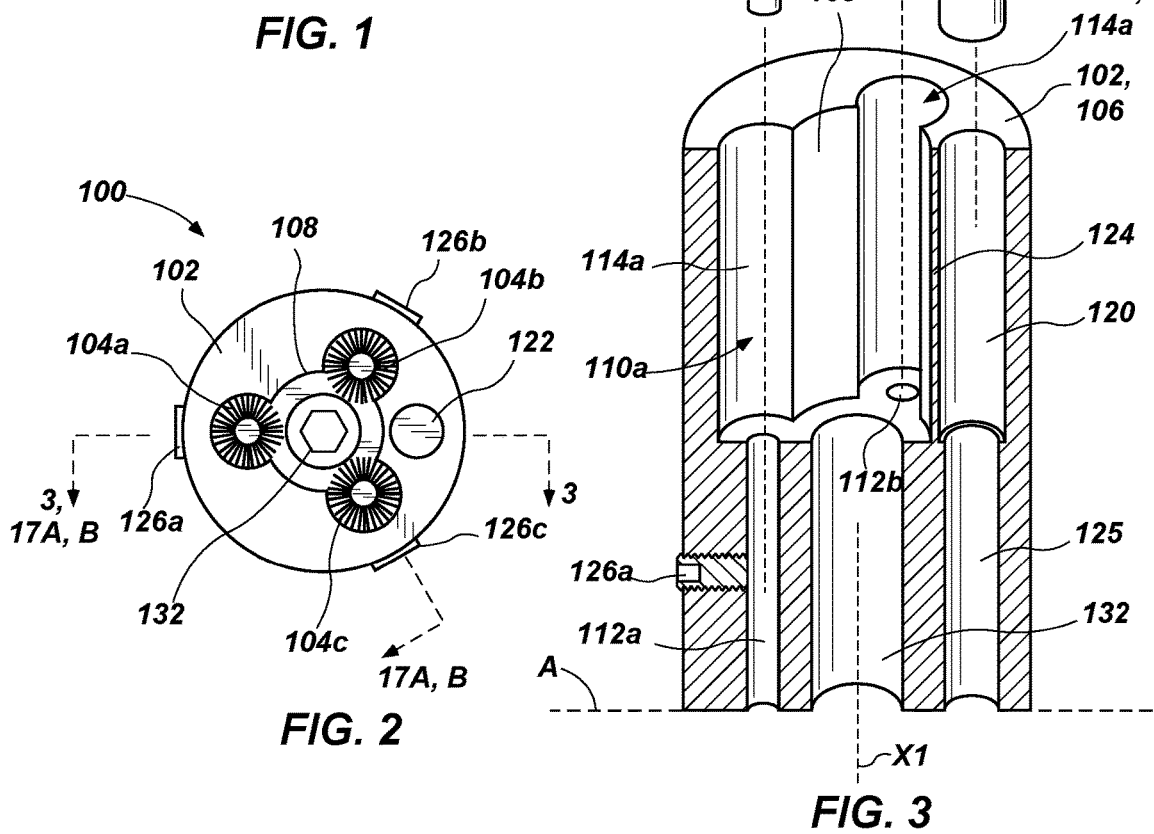
FIG. 2
FIG. 3

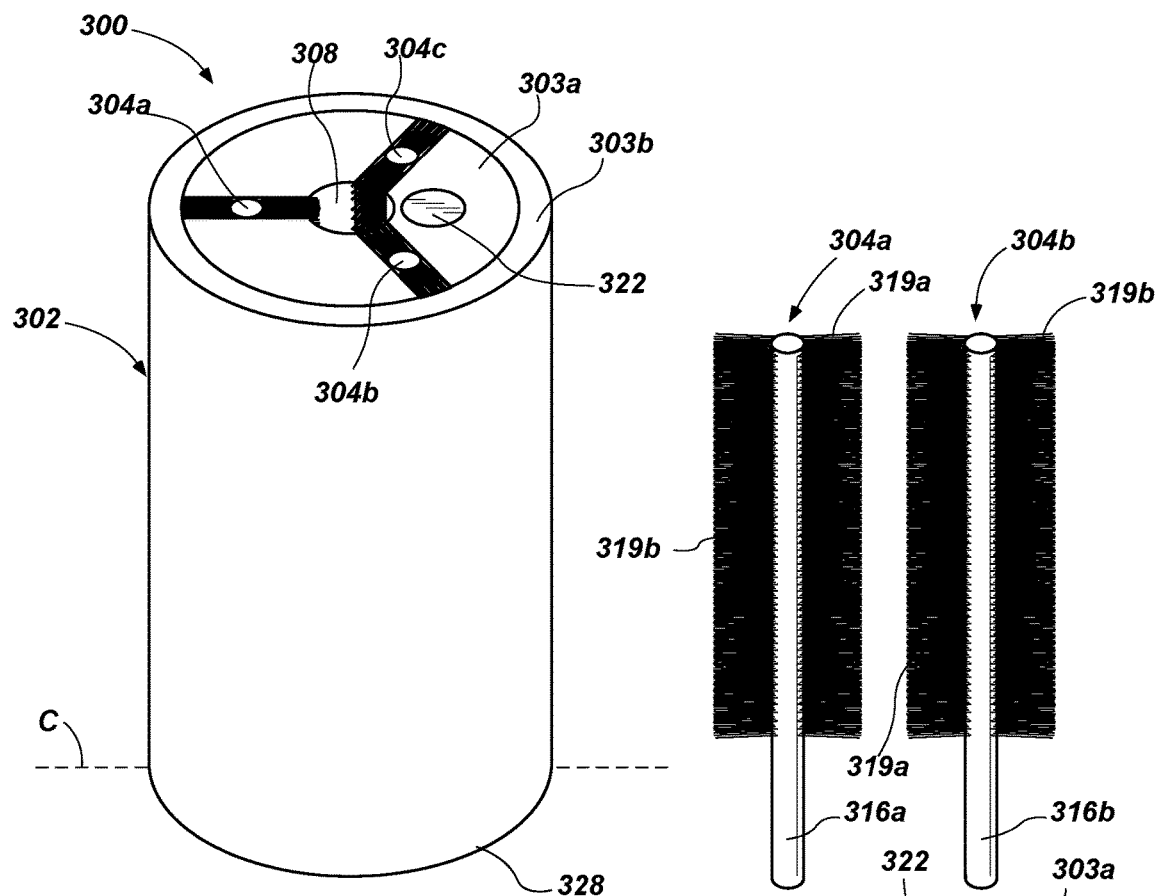
FIG. 7
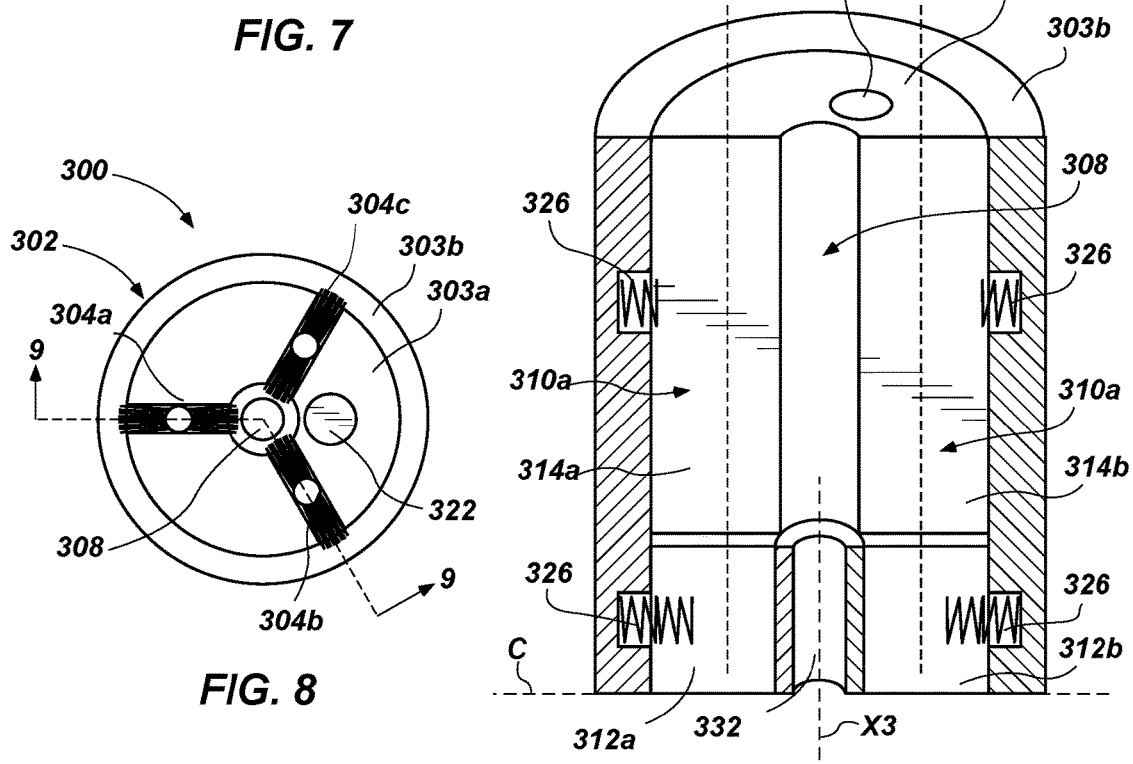
FIG. 8
FIG. 9

ROTARY CLEANING TOOL

BACKGROUND

It is common for threaded fasteners (and other associated parts or components) used in home improvement, aerospace, automotive, locomotive and various other industries utilize structural bonding adhesives to lock and seal threaded fasteners to structures or hardware. Such adhesives can dry, crack, and corrode over time, which may require the adhesives to be re-applied. Such threaded fasteners also often collect debris over time due to their exposure to various industrial and environmental elements, which can accumulate on and around the threads, nuts, and/or adjacent surfaces and components.

Typically such fasteners need to be removed, cleaned, and replaced. However, in some applications, the fasteners cannot readily be removed from the hardware, so other hardware parts must be removed to expose the threads of the fasteners for cleaning. The presence of the residual structural bonding adhesive (e.g., thread lock), and/or the presence of other debris, can present significant problems in terms re-using the fasteners or re-attaching a piece of hardware to the structure supporting the fasteners.

Prior attempts include using straight wire cleaning brushes and cleaning by hand to remove residual adhesives and debris from the threads of fasteners. However, this approach is very time-consuming and labor-intensive, and therefore is quite ineffective for removing debris from the fasteners and surrounding surfaces in an efficient, cost-effective manner.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 1 illustrates an isometric view of a cleaning tool, in accordance with an example of the present disclosure;

FIG. 2 illustrates a top view of the cleaning tool of FIG. 1;

FIG. 3 illustrates a partially exploded isometric and cross sectional view of the cleaning tool of FIG. 1, taken along lines 3-3 of FIG. 2, and cut off at the bottom of the tool at line A of FIG. 1;

FIG. 7 illustrates an isometric view of a cleaning tool in accordance with an example of the present disclosure;

FIG. 8 illustrates a top view of the cleaning tool of FIG. 7;

FIG. 9 illustrates a partially exploded and isometric view of the cleaning tool of FIG. 7, taken along lines 9-9 of FIG. 8, and cut off at the bottom of the tool at line C of FIG. 7;

Figure 4:
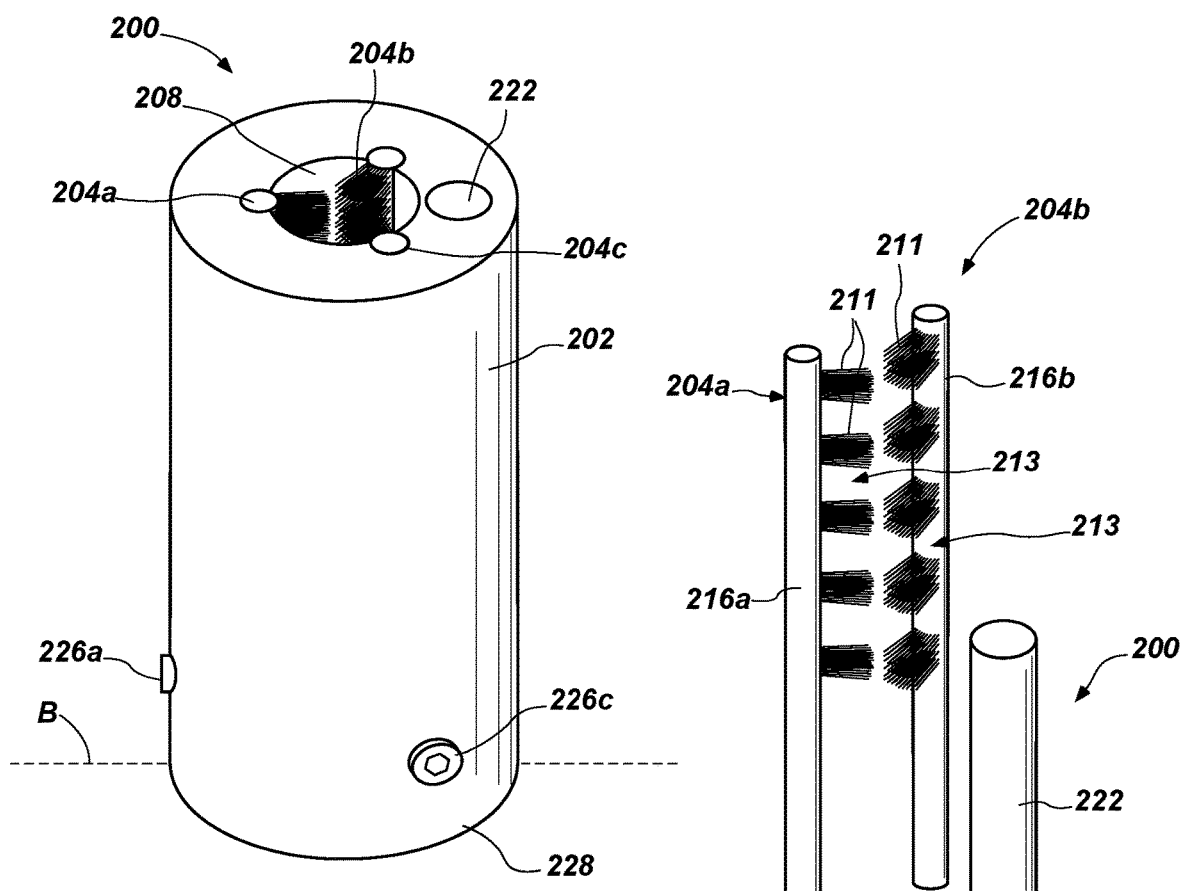
FIG. 4 illustrates an isometric view of a cleaning tool in accordance with an example of the present disclosure.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The present disclosure sets forth a rotary cleaning tool designed for the purpose of removing adhesives, such as structural bonding adhesives (e.g., thread locking-type structural bonders or structural bonding adhesives), as well as debris, such as rust, corrosion and other foreign matters, from objects. For instance, fasteners and other similar objects used in home improvement, aerospace, automotive, locomotive and various other industries can collect debris over time due to their exposure to various industrial and environmental elements. In addition, many fasteners are used with the assistance of thread locking bonding adhesives or other materials that may need to be removed during maintenance of the hardware supporting the fasteners. If left uncleaned, the accumulated debris and any residual bonding adhesive can cause damage to the various fasteners and parts during maintenance and repair operations, and can also prevent proper loading of fasteners, which can be quite problematic.

Although not to be considered limiting in any way, in one example, an asset, such as an aerospace defense system, namely a sidewinder missile or other missile, can comprise captive bolts (i.e., bolts that are not readily removable from the fastened components of the asset (e.g., those used to provide the clamping force needed to secure shims of a center hanger of the missile)). Such "captive bolts" are typically known as the fasteners that cannot be removed from the asset (e.g., missile) without causing severe damage to the asset that can compromise the asset. In other words, captive bolts, once in place, can be considered part of the asset or structure, and cannot or should not be removed. In the example of a missile, the center hanger may be in need of repair. However, replacing the captive bolts is not always possible or feasible without damaging the missile. Therefore, it is desirable or necessary to clean and reuse the existing captive bolts that have threaded ends extending outwardly from a lower hanger bracket/shim that is attached to the missile body, for instance. Once an upper hanger bracket/shim is unbolted from the lower hanger bracket/shim (thereby exposing threads of the fasteners), any residual bonding adhesive and any accumulated debris on the fastener (and nearby surfaces) must be cleaned before the upper bracket/shim can be re-attached. As noted above, prior techniques involved using a hand-held wire brush to clean as much of the adhesive and debris from the surfaces as possible. While this is effective at cleaning some of the adhesive and debris, it is considerably time consuming, and does not result in complete and thorough cleaning. Oftentimes the residual bonding adhesive must be heated and then the bonding adhesive needs picked from each of the individual threads of the fasteners, which is an extremely laborious and time intensive process, particularly when considering this may need to be done for numerous fasteners.

More particularly, in one example the present disclosure sets forth a cleaning tool for cleaning an object comprising: a housing comprising an intake end and a back end; a cleaning chamber formed through the housing from the intake end; and a retaining cavity formed through the housing and in fluid communication with the cleaning chamber; and a cleaning element supported by the retaining cavity, such that a portion of the cleaning element extends into the cleaning chamber for cleaning an object upon rotation of the housing relative to the object (i.e., rotating the housing or rotation of the cleaning element).

The present disclosure sets forth a method of cleaning a portion of an object with a cleaning tool comprising: inserting a portion of an object into a cleaning chamber of the cleaning tool having at least one cleaning element at least partially extending into the cleaning chamber; and rotating the cleaning tool relative to the object by hand or with a hand tool to clean a surface of the object with the at least one cleaning element.

FIGS. 1-3 illustrate a cleaning tool 100 in accordance with an example of the present disclosure. As an overview, the cleaning tool 100 can be utilized to clean an object, such as a fastener (e.g., a bolt, a screw or any other type of fastener), or other types of objects, such as nails, pipes, etc. The cleaning tool 100 can be a socket-type rotary cleaning tool configured to receive the object, and then can be rotated about the object (by a manual tool, manually by hand, or by a power tool) for cleaning the object/fastener, such as illustrated and described below in the example of FIGS. 17A and 17B. Alternatively, the cleaning tool 100 can remain stationary and held in place by hand or a tool, and then the object/fastener can be rotated for cleaning (or the cleaning tool and object can both be rotated at the same time in opposite directions for a faster cleaning operation.

More specifically, the cleaning tool 100 can comprise a housing 102 configured to receive and support a plurality of cleaning members 104a-c that clean an object (e.g., threads of a fastener). The housing 102 can comprise an intake end 106 operable to receive the object to be cleaned (see e.g., FIG. 17A). The housing 102 can further comprise or define a cleaning chamber 108 extending from the intake end 106 through a portion of the housing 102, and the cleaning chamber 108 can be centrically located through the housing 102 and can define a central longitudinal axis X1. The housing 102 can further comprise or define a plurality of retaining cavities 110a-c formed through the housing 102 generally in the same direction as, or parallel to, the central longitudinal axis X1. The retaining cavities 110a-c can each comprise a respective support opening 112a-c (two labeled in FIG. 3) and a respective cleaning member opening 114a-c (two labeled in FIG. 3) in fluid communication with (i.e., open to) each other. The support openings 112a-c can have a smaller diameter than that of the cleaning member openings 114a-c for supporting respective cleaning elements 104a-c, as detailed below. Each of the cleaning member openings 114a-c can be in fluid communication with the cleaning chamber 108, and therefore the cleaning member openings 114a-c are in fluid communication with each other via the cleaning chamber 108.

In one example, the cleaning elements 104a-c can comprise respective shafts 116a-c that support respective cleaning members 118a-c (e.g., bristles of stainless steel wire, carbide steel, nylon, brass, etc. arranged in any configuration or pattern) coupled at upper ends of the shafts 116a-c. The lower ends of the shafts 116a-c can be received through and supported by respective support openings 112a-c, while the cleaning members 118a-c extend through and are situated in respective cleaning member openings 114a-c. As best illustrated in FIG. 2, at least a portion of each of the cleaning members 118a-c are positioned and configured to extend at least partially into the cleaning chamber 108. The cleaning member openings 114a-c can generally surround the cleaning chamber 108, and can be situated equidistance from each other (and generally define an equilateral triangular zone as defined by and between their shafts 116a-c). Note that reference to "upper" and lower throughout the present disclosure is not meant to be limiting to a particular orientation, and are only used with reference to orientation shown in the drawings.

In the example shown, the cleaning members 118a-c comprise a spiral bristle arrangement, much like a flute-type wire brush device, so that when the cleaning tool 100 receives a fastener for cleaning, inner portions of the bristles of the spiral bristle arrangement engage with the threads of the fastener in a manner such that the cleaning members 118a-c tend to automatically thread along the threads of the fastener during rotation of the housing 102. In turn, this automatically axially translates or axially draws the cleaning tool 100 relative to and along the fastener, as further detailed below regarding FIGS. 17A and 17B. In another example, the cleaning members can comprise circular or cylindrical brush-like cleaning members (not shown) extending around the shaft, or any other arrangement or pattern.

Note that the cleaning member openings 114a-c can have sidewalls, and can generally define a cylindrically shaped envelope or area that can be sized in diameter the same as, or slightly larger than, a general diameter defined by the bristles of the cleaning elements. Moreover, the cleaning chamber 108 can generally define a cylindrically shaped envelope or area that overlaps with a portion of each of the "cylindrically shaped envelopes" of the retaining cavities 104a-c. This is best shown in FIG. 2 with the envelope boundaries being imaginary cylinders being placed about, and having the same diameter as the cleaning member openings 114a-c and the cleaning chamber 108, respectively.

The cleaning tool 100 can further comprise a bore 120 formed through the housing 102, which can extend from the intake end 106 and partially through the housing 102. The bore 120 can be located adjacent the cleaning chamber 108. A magnet 122 can be received in and inserted into the bore 120. The magnet 122 can be removably retained within the bore 120, meaning that the magnet 122 can be removed as needed or desired, as discussed below. Alternatively, the magnet 122 can be permanently installed into the bore 120 of the housing 102. A sidewall 124 can be situated between the magnet 122 and the cleaning chamber 108, thereby separating the magnet 122 from the cleaning chamber 108. However, the magnet 122 can be selected so as to have sufficient magnetic strength to generate a magnetic field through the sidewall 124 for attracting ferromagnetic debris removed from the object and collected about the cleaning chamber 108. Accordingly, the magnet 122 operates to attract any ferromagnetic foreign object debris (FOD) that is scrubbed or cleaned from the object. Thus, the magnet 122 causes ferromagnetic material to be attracted to walls that define the cleaning chamber 108, particularly near sidewall 124 where the magnetic force may be the greatest.

After a cleaning operation, the attracted ferromagnetic FOD can be removed and discarded from the cleaning tool 100. This can be achieved by manually removing/picking the ferromagnetic FOD, or removing the magnet 122 from the housing 104 such that the ferromagnetic FOD can merely fall out or be shaken out of the cleaning tool 100 for discarding the debris. In the example where the magnet 122 is removable, a channel 125 can be formed through the housing 102 opposite the bore 120, which is in fluid communication with the bore 120. A small tool can be inserted through the channel 125 to push the magnet 122 out of the bore 120.

The cleaning tool 100 can comprise a plurality of biasing mechanisms, such as a plurality of set screws 126a-c, coupled to the housing 102 and operable to apply a radial compression force to the respective cleaning elements 104a-c. The set screws 126a-c can be threadably advanced inwardly to contact and compress the respective lower ends of the shafts 116a-c to apply a clamping force that holds the cleaning elements 104a-c in place, thereby being secured to the housing 102. The cleaning elements 104a-c can be similarly removed by releasing this clamping force, and then the cleaning elements 104a-c can be cleaned and replaced or interchanged with new ones, such as when the bristles have been worn down to an unusable condition.

A back end 128 of the housing 102 can comprise a rotation interface for facilitating rotation of the housing 102 while cleaning an object. In one example, the rotation interface can comprise a knurled or friction surface 130 (FIG. 1) formed about an outer surface of the housing 102 for gripping with a hand of a user to better effectuate rotation of the housing 102. Another example of a rotation interface can include a tool bit aperture 132 (FIGS. 2 and 17A) formed centrally through the housing 102 at the back end 128 for receiving a tool bit of a rotary tool (e.g., hand tool or power tool) for rotating the housing 102 during cleaning of an object, such as illustrated and further described below regarding FIGS. 17A and 17B.

Figure 5:
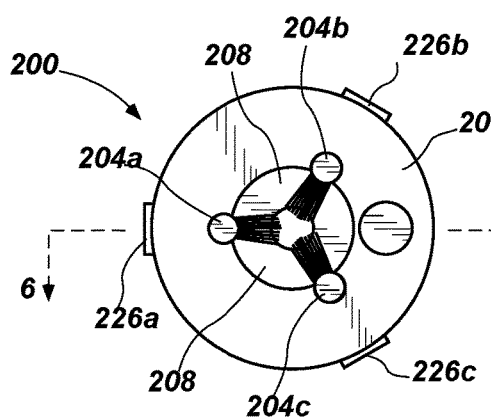
FIG. 5 illustrates a top view of the cleaning tool of FIG. 4.
Figure 6:
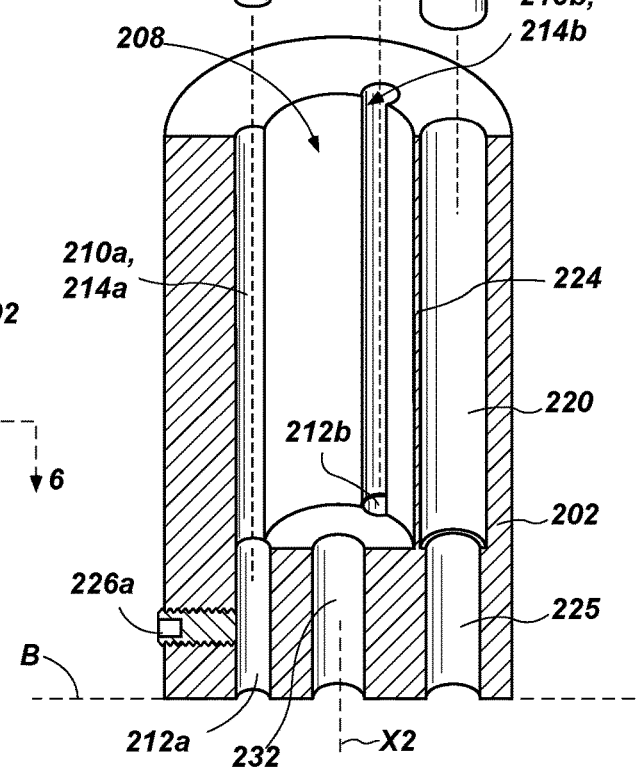
FIG. 6 illustrates a partially exploded and isometric view of the cleaning tool of FIG. 4, taken along lines 6-6 of FIG. 5, and cut off at the bottom of the tool at line B of FIG. 4.

FIGS. 4-6 illustrate a cleaning tool 200 in accordance with an example of the present disclosure. It should be appreciated from the following discussion that the cleaning 200 can operate similarly as described above regarding cleaning tool 100 in various aspects. More specifically, the cleaning tool 200 can comprise a housing 202 configured to receive and support a plurality of cleaning members 204a-c. The housing 202 can comprise an intake end 206 operable to receive the object to be cleaned (see e.g., FIG. 17A). The housing 202 can further comprise or define a cleaning chamber 208 extending from the intake end 206 through a portion of the housing 202, and the cleaning chamber 208 can be centrically located through the housing 202 and can define a central longitudinal axis X2. The housing 202 can further comprise or define a plurality of retaining cavities 210a-c formed through the housing 202 generally in the same direction as, or parallel to, the central longitudinal axis X2. The retaining cavities 210a-c can each comprise a respective support opening 212a-c and a respective cleaning member opening 214a-c in fluid communication with each other. The support openings 212a-c can have the same or a smaller diameter than that of the cleaning member openings 214a-c for supporting respective cleaning elements 204a-c. As illustrated in FIG. 6, each of the retaining cavities 210a-c and the cleaning member openings 214a-c is in fluid communication with the cleaning chamber 208, and therefore the cleaning member openings 214a-c are in fluid communication with each other via the cleaning chamber 208. As such, the cleaning elements 204a-c can extend into the cleaning chamber 208

In one example, the cleaning elements 204a-c can comprise respective shafts 216a-c that support respective cleaning members 218a-c (e.g., wire bristles, or any other types or combination of types) coupled at upper ends of the shafts 216a-c. The lower ends of the shafts 216a-c can be received through and supported by respective support openings 212a-c, while the cleaning members 218a-c extend inwardly into the cleaning chamber 208. Thus, as best illustrated in FIG. 5, at least a portion of each of the cleaning members 218a-c extend at least partially into the cleaning chamber 208. The retaining cavities 210a-c and cleaning member openings 214a-c can generally surround the cleaning chamber 208, and can be situated equidistance from each other (and generally define an equilateral triangular zone as defined by and between their shafts 216a-c). In this example, the cleaning member openings 214a-c are relatively small in diameter to support the respective upper ends of the shafts 216a-c, because of the type of bristles, for example, supported by the shafts 216a-c.

As shown, the cleaning members 218a-c can each comprise a linear bristle arrangement attached along an inner side of the upper ends of the respective shafts 216a-c. Although not spiraled (like those in FIG. 3), inner portions of the cleaning members 218a-c (e.g., bristles) of the linear bristle arrangement can still engage with the threads of the fastener in a manner that the cleaning members 218a-c somewhat flex or bend, so that they can tend to automatically thread along the threads of the fastener during rotation of the housing 202. In turn, this automatically axially translates or axially draws the cleaning tool 200 relative to and along the fastener, similarly as described regarding FIGS. 17A and 17B.

In an alternative example, the linear bristle arrangement of the cleaning elements 204a-c can each comprise a plurality of bristle segments 211 separated by gaps 213 along a length of the respective shafts 216a-c. One purpose of the gaps 213 is to facilitate collecting debris about the gaps 213 during cleaning, so that the debris/FOD can be captured about the cleaning tool 200 (instead of falling out into a work area). After cleaning an object, the captured debris/FOD can be shaken out or otherwise removed, such as by removing the cleaning elements 204a-c from the housing 202.

The cleaning tool 200 can further comprise a bore 220 formed through the housing 202, which can extend from the intake end 206. The bore 220 can be located adjacent the cleaning chamber 208. A magnet 222 can be received in and inserted into the bore 220. The magnet 222 can be removably retained within the bore 220, meaning that the magnet 222 can be removed as needed or desired. Alternatively, the magnet 222 can be permanently installed in the housing 202. A sidewall 224 can be situated between the magnet 222 and the cleaning chamber 208. The magnet 222 can operate similarly as described above regarding FIG. 3 for removing ferromagnetic FOD.

The cleaning tool 200 can comprise a plurality of biasing mechanisms, such as a plurality of set screws 226a-c, coupled to the housing 202 and operable to apply a radial compression force to the respective cleaning elements 204a-c as received within the support openings 212a-c. The set screws 226a-c can be threadably advanced inwardly to contact and compress the respective lower ends of the shafts 216a-c to apply a clamping force that holds the cleaning elements 204a-c in place, thereby being secured to the housing 202. The cleaning elements 204a-c can be similarly removed by releasing this clamping force, as discussed above.

A back end 228 of the housing 202 can comprise a rotation interface for facilitating rotation of the housing 202 while cleaning an object. In one example, the rotation interface can comprise a knurled or friction surface (e.g., similar to the knurled surface 130 of FIG. 1) formed about an outer surface of the housing 202 for gripping with a hand and rotating the housing 202. Another example of a rotation interface can include a tool bit aperture (e.g., 132 of FIG. 2) formed centrally through the housing 202 at the back end 228 for receiving a tool bit of a rotary tool (e.g., hand tool or power tool) for rotating the housing 202 during cleaning of an object, such as illustrated and further described below regarding FIGS. 17A and 17B.

FIGS. 7-9 illustrate a cleaning tool 300 in accordance with an example of the present disclosure. It should be appreciated from the following discussion that the cleaning 300 can operate similarly as described above regarding the above disclosed cleaning tools. More specifically, the cleaning tool 300 can comprise a housing 302 configured to receive and support a plurality of cleaning elements 304a-c. The housing 302 can comprise an inner housing 303a and an outer housing 303b that can be fit together, where the inner housing 303a is generally cylindrically shaped and is received through a cylindrical cavity of the outer housing 303b in a nested manner. In one example, the inner housing 303a and the outer housing 303b can be joined together via a threaded interface. In another aspect, these can be joined together using a press or interference fit. Those skilled in the art will recognize the many different ways and interfaces that can be used to join the inner and outer housings together. The housing 302 can comprise an intake end 306 operable to receive the object to be cleaned (see e.g., FIG. 17A).

The inner housing 303a can comprise or define a cleaning chamber 308 extending from the intake end 306, which can be centrically located through the housing 302 and can define a central longitudinal axis X3. The inner housing 303a can further comprise or define a plurality of retaining cavities 310a-c formed through the inner housing 303a generally in the same direction, or parallel to, the central longitudinal axis X3. The retaining cavities 310a-c can each comprise a respective support opening 312a-c and a respective cleaning member opening 314a-c in fluid communication with each other. The cleaning member openings 314a-c can be formed as generally rectangular slots formed through the inner housing 303a for supporting the cleaning elements 304a-c, while an inner surface of the outer housing 303b assists to retain the cleaning elements 304a-c within the respective cleaning member openings 314a-c. Thus, as illustrated in FIG. 9, each of the cleaning member openings 314a-c is in fluid communication with the cleaning chamber 308, and therefore the cleaning member openings 314a-c are in fluid communication with each other via the cleaning chamber 308.

In one example, the cleaning elements 304a-c can comprise respective shafts 316a-c and respective cleaning members 318a-c (e.g., wire bristles or any others as discussed herein) coupled at upper ends of the shafts 316a-c. The lower ends of the shafts 316a-c can be received through and supported by respective support openings 312a-c. The cleaning members 318a-c can comprise a linear bristle arrangement having a first set of bristles 319a attached along an inner side of the upper ends of the respective shafts 316a-c, and a second set of bristles 319b attached along an opposing outer side of the respective shafts 316a-c, these being oriented and extending in directions 180 degrees from one another. Although not spiraled (like FIG. 3), inner portions of the first set of bristles 319a can engage with the threads of the fastener in a manner that the cleaning members 318a-c somewhat flex or bend, so that they can tend to automatically thread along the threads of the fastener during rotation of the housing 302. In turn, this automatically axially translates or axially draws the cleaning tool 300 relative to and along the fastener, similarly as described regarding FIGS. 17A and 17B. In an alternative example, a first set of bristles of the cleaning members (i.e., 310a-c) can have a plurality of separated bristle segments separated by gaps, such as shown and described above regarding FIG. 6.

The cleaning tool 300 can further comprise a bore 320 formed through the inner housing 303a, which can extend from the intake end 306. The bore 320 can support a magnet 322, and having the same configuration and purpose as described above regarding the examples of FIGS. 1 and 4.

The cleaning tool 300 can comprise a plurality of biasing mechanisms, such as a plurality of upper and lower elastic elements 326 in the form of springs (only four shown), coupled to the housing 302 and operable to apply a radial compression force to the respective cleaning elements 304a-c to accommodate different sizes/diameters of fasteners or objects. More specifically, each elastic element 326 can be disposed laterally through bores of the outer housing 303b, and seated against the inner surface of the outer housing 303b. The free ends of the elastic elements 326 can extend inwardly into respective cleaning member openings 314a-c and biased to respective cleaning elements 304a-c. A plate or other support surface (not shown) can be attached to the free ends of the elastic elements 326 for interfacing with respective second set of bristles 319b and lower ends of respective shafts 316a-c. Therefore, each cleaning element 304a-c will have a pair of elastic elements 326 (an upper one and a lower one) biasing inwardly the respective cleaning element 304a-c toward the cleaning chamber 308. Thus, when a larger diameter fastener is received through the cleaning chamber 308, it can automatically push outwardly/radially the cleaning elements 304a-c due to the compliant nature of the elastic elements 326 that cooperatively and collectively compress upon the force applied by the larger diameter fastener, for instance, which automatically increases the lateral cleaning area defined by the cleaning elements 304a-c. Stated differently, the biased cleaning elements 304 can be variably positioned to accommodate different sized objects to be cleaned.

The elastic elements 326 can be any suitable coil spring or other spring, or even an elastomeric component. The elastic elements 326 further provide an advantage of applying an inward radial force to the respective cleaning elements 304a-c toward the central longitudinal axis X3, and consequently an inward radial force to the threads of the fasteners, so that the bristles are continually engaged with a sufficient amount of force to dig into the threads of for effectively cleaning debris.

A back end 328 of the housing 302 can comprise a rotation interface for facilitating rotation of the housing 302 while cleaning an object. In one example, the rotation interface can comprise a knurled or friction surface (e.g., similar to the knurled surface 130 of FIG. 1) formed about an outer surface of the outer housing 303b for gripping with a hand and rotating the housing 302. Another example of a rotation interface comprises a tool bit aperture (e.g., 132 of FIG. 2) formed centrally through the outer housing 303b at the back end 328 for receiving a tool bit of a rotary tool (e.g., hand tool or power tool) for rotating the housing 302 during cleaning of an object, such as illustrated and further described below regarding FIGS. 17A and 17B.

Figure 10:
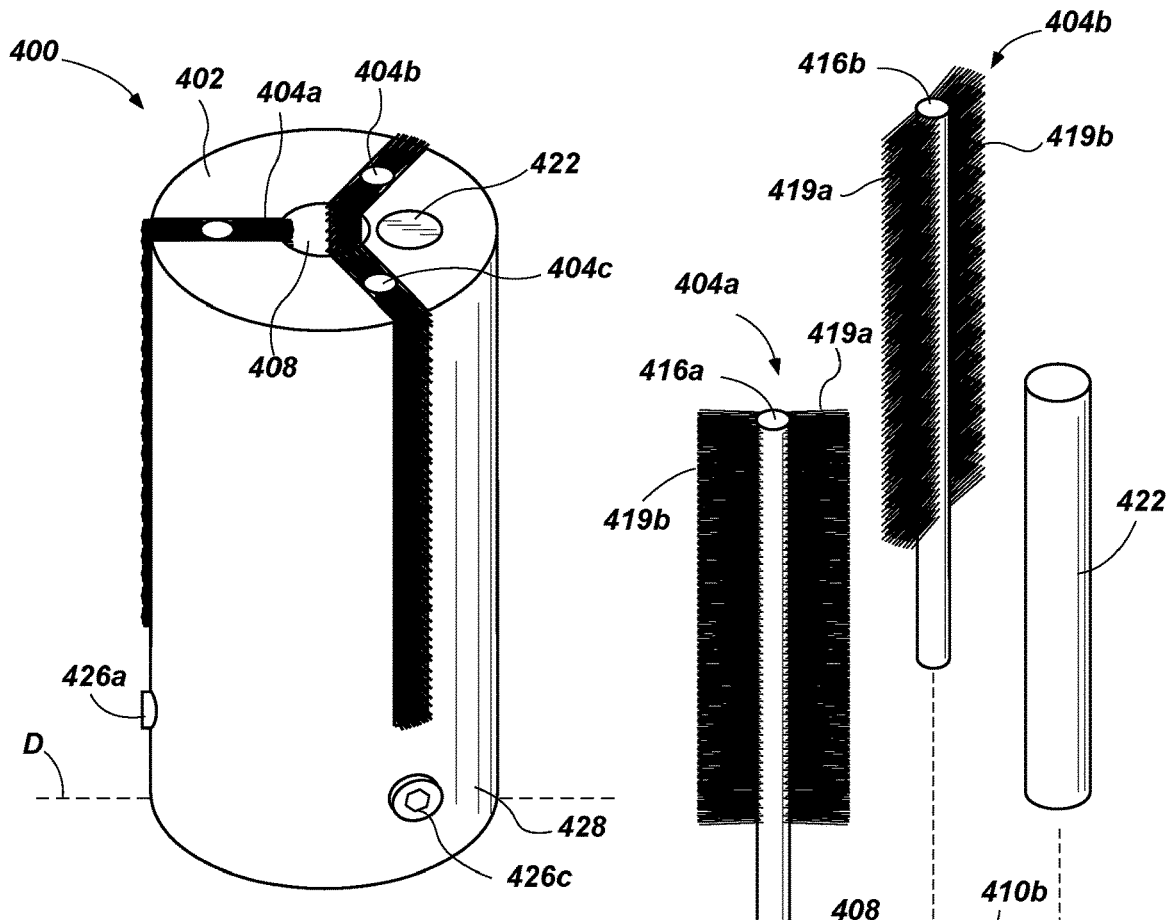
FIG. 10 illustrates an isometric view of a cleaning tool in accordance with an example of the present disclosure.
Figure 11:
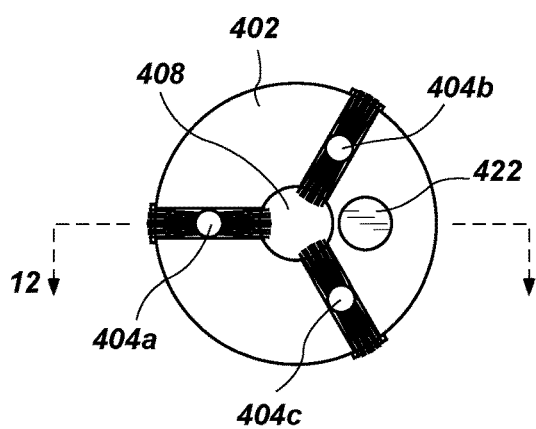
FIG. 11 illustrates a top view of the cleaning tool of FIG. 10.
Figure 12:
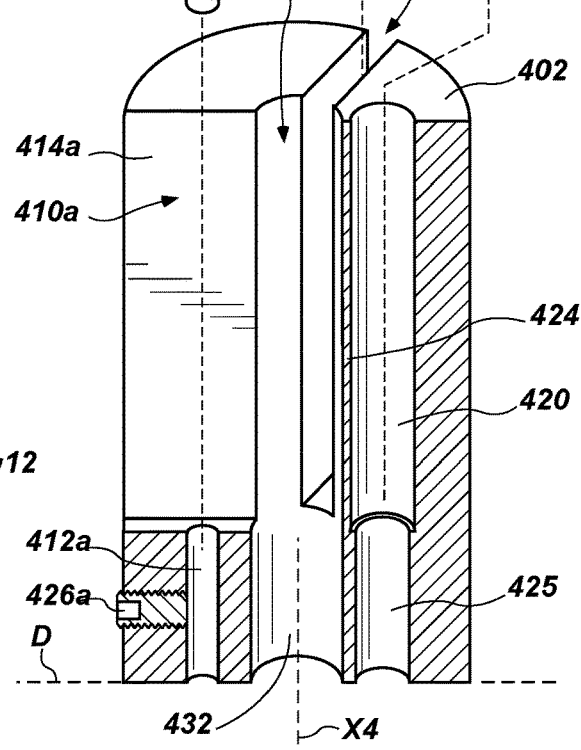
FIG. 12 illustrates a partially exploded and isometric view of the cleaning tool of FIG. 10, taken along lines 12-12 of FIG. 11, and cut off at the bottom of the tool at line D of FIG. 10.

FIGS. 10-12 illustrate a cleaning tool 400 in accordance with an example of the present disclosure. It should be appreciated from the following discussion that the cleaning 400 can operate similarly as those described above, such as cleaning tool 300, for instance. More specifically, the cleaning tool 400 can comprise a housing 402 configured to receive and support a plurality of cleaning elements 404a-c. The housing 402 can comprise an intake end 406 operable to receive the object to be cleaned (see e.g., FIG. 17A). The housing 402 can comprise or define a cleaning chamber 408 extending from the intake end 406 through a portion of the housing 202, and the cleaning chamber 208 can be centrically located through the housing 402 and can define a central longitudinal axis X4. The housing 402 can further comprise or define a plurality of retaining cavities 410a-c formed through the housing 402 generally in the same direction as, or parallel to, the central longitudinal axis X4. The retaining cavities 410a-c can each comprise a respective support opening 412a-c and a respective cleaning member opening 414a-c in fluid communication with each other. The cleaning member openings 414a-c can be formed at generally rectangular slots formed through the housing 402 for supporting the cleaning elements 404a-c. Thus, as illustrated in FIG. 12, each of the cleaning member openings 414a-c is in fluid communication with the cleaning chamber 408, and therefore the cleaning member openings 414a-c are in fluid communication with each other via the cleaning chamber 408.

In one example, the cleaning elements 404a-c can comprise respective shafts 416a-c and respective cleaning members 419a-c (e.g., wire bristles) supported at upper ends of the shafts 416a-c. The lower ends of the shafts 416a-c can be received through and supported by respective support openings 412a-c. The cleaning members 419a-c can comprise a linear bristle arrangement having a first set of bristles 419a attached along an inner side of the upper ends of the respective shafts 416a-c, and a second set of bristles 419b attached along an opposing outer side of the shafts 416a-c. Although not spiraled (like FIG. 3), inner portions of the first set of bristles 419a can engage with the threads of the fastener in a manner that the cleaning members 419a-c somewhat flex or bend, so that they can tend to automatically thread along the threads of the fastener during rotation of the housing 402. In turn, this automatically axially translates or axially draws the cleaning tool 400 relative to and along the fastener, similarly as described regarding FIGS. 17A and 17B. In an alternative example, a first set of bristles of the cleaning members (i.e., 410a-c) can have a plurality of bristle segments separated by gaps, such as shown and described above regarding FIG. 6.

Although similar in many respects to the cleaning tool 300 shown in FIGS. 7-9, the cleaning tool 400 does not comprise a two-piece housing. Rather, in the example shown in FIGS. 10-12, the cleaning member openings 414a-c, formed as slots, can extend entirely through the housing 402 (see FIG. 12) from the cleaning chamber 408 to the perimeter of the housing, such that the cleaning members 419a-c can extend into the cleaning chamber 408 as well as beyond an outside perimeter of the housing 402, thus causing at least a portion of the cleaning members 419a-c to be exposed outside of the housing. With this configuration, the cleaning tool 400 can not only be operable to receive an object to be cleaned within the cleaning chamber 408, but the cleaning tool 400 can be used to clean along or inside of an object. For example, the cleaning tool 400 could be used to clean the inside of a pipe by inserting the cleaning tool 400 within the pipe and causing the cleaning members 419a-c extending in different directions beyond the perimeter of the housing 402 to contact the inside surface or wall of the pipe. It is noted that any of the example cleaning tools can be configured to cause the cleaning members to extend beyond the housing (as well as into the cleaning chamber) to be exposed outside of the housing for the purposes discussed herein, as well as any others as recognized by those skilled in the art.

The cleaning tool 400 can further comprise a bore 420 formed through the housing 402, which can extend from the intake end 406. The bore 420 can support a magnet 422 having the same configuration and purpose as described above regarding the examples discussed herein.

The cleaning tool 400 can comprise a plurality of biasing mechanisms, such as a plurality of set screws 426a-c, coupled to the housing 402 and operable to apply a radial compression force to the respective cleaning elements 404a-

*c*. The set screws 426*a-c* can be threadably advanced inwardly to contact and compress the respective lower ends of the shafts 416*a-c* to apply a clamping force that holds the cleaning elements 404*a-c* in place, thereby being secured to the housing 402. The cleaning elements 404*a-c* can be similarly removed by releasing this clamping force, as discussed herein.

A back end 428 of the housing 402 can comprise a rotation interface for facilitating rotation of the housing 402 while cleaning an object. In one example, the rotation interface can comprise a knurled or friction surface (e.g., 130 of FIG. 1) formed about an outer surface of the housing 402 for gripping with a hand of the user and rotating the housing 402. Another example of a rotation interface can include a tool bit aperture (e.g., 132 of FIG. 2) formed centrally through the housing 402 at the back end 428 for receiving a tool bit of a rotary tool (e.g., hand tool or power tool) for rotating the housing 402 during cleaning of an object, such as illustrated and further described below regarding FIGS. 17A and 17B.

Figure 13:
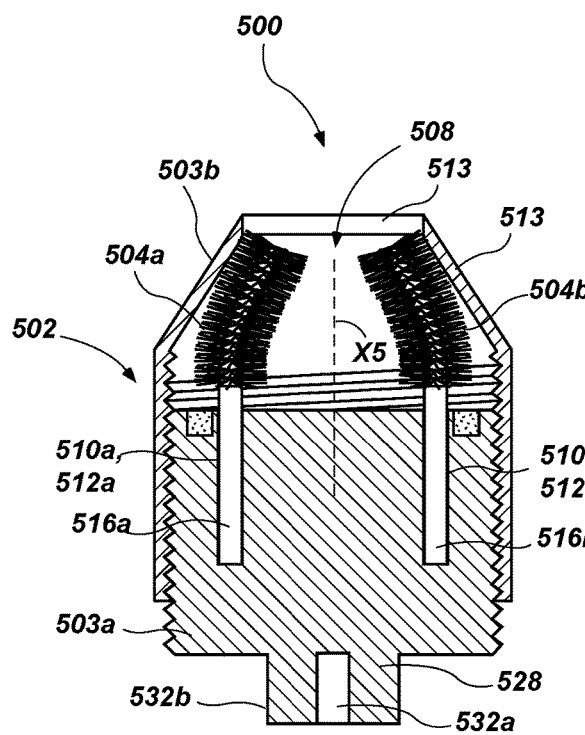
FIG. 13 illustrates a cross sectional view of a cleaning tool in accordance with an example of the present disclosure, the cleaning tool being shown in a first, tightened position.
Figure 14:
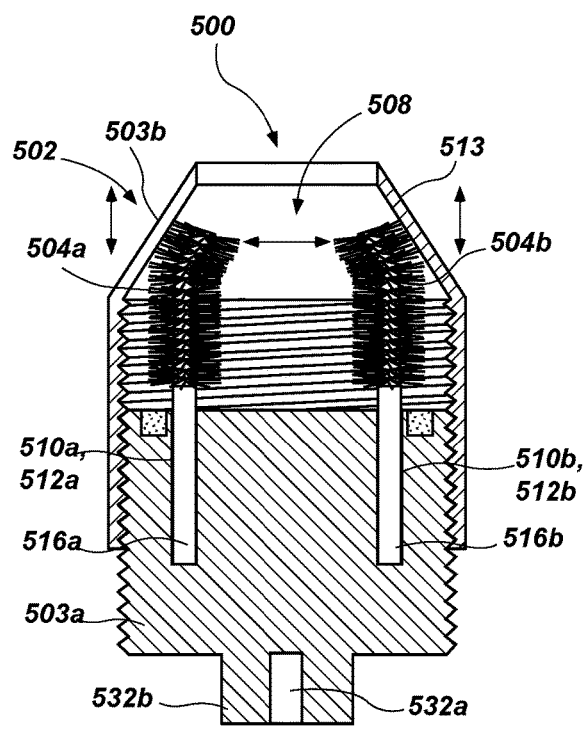
FIG. 14 illustrates a cross sectional view of the cleaning tool of FIG. 13 and in an untightened position.

FIGS. 13 and 14 illustrate a cleaning tool 500 in accordance with an example of the present disclosure. The cleaning tool 500 can comprise a housing 502 configured to receive and support a plurality of cleaning elements 504*a* and 504*b* (or three or more cleaning elements). The housing 502 can be comprised of a first housing 503*a* and a second housing 503*b* threadably coupled to the first housing 503*a*, these being threadably and axially adjustable relative to each other. Thus, the first housing 503*a* can be a generally solid body having an outer threaded surface, while the second housing 503*b* can be a cap or hollow body having an inner threaded surface that interfaces with the outer threaded surface. Therefore, a user can threadably rotate the housings 503*a* and 503*b* relative to each other, for reasons detailed below.

Figure 17A:
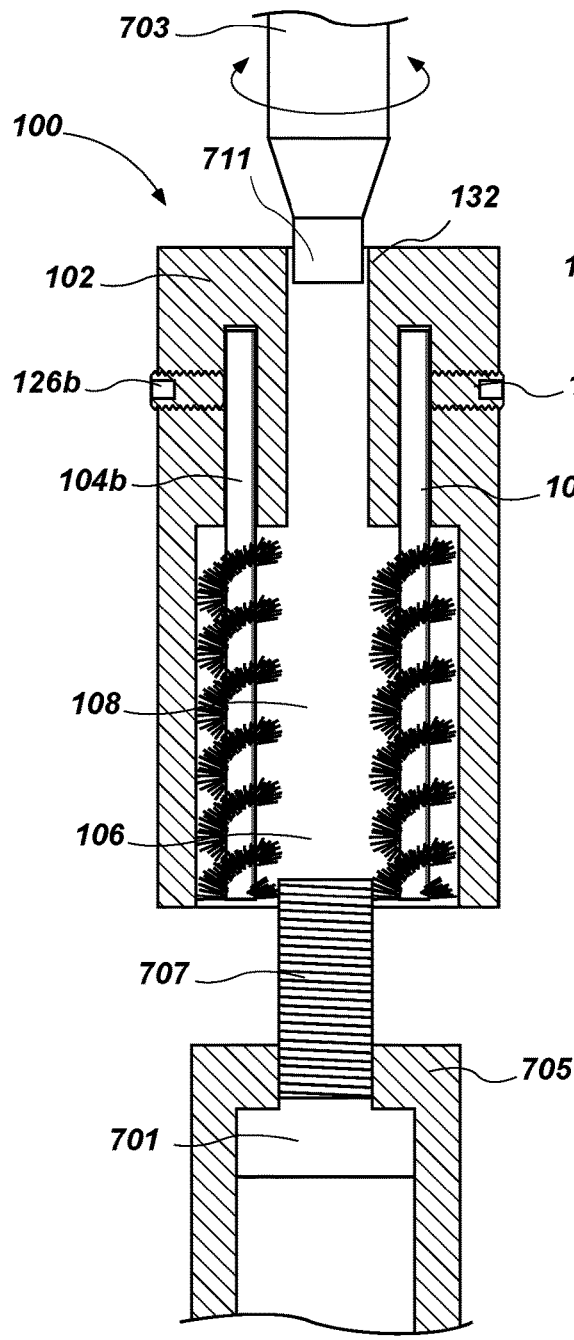
FIG. 17A illustrates a cross sectional view of the cleaning tool of FIGS. 1-3 being engaged with a hand tool and in a first position for cleaning a fastener in accordance with an example of the present disclosure, and which is also applicable for the examples of the other cleaning tools described herein.

The second housing 503*b* can comprise an intake end 506 operable to receive an object or fastener to be cleaned (see e.g., FIG. 17A). The second housing 503*b* can comprise or define a cleaning chamber 508 extending from the intake end 506 and defined, at least in part, by the wall of the second housing 503*b*, and the cleaning chamber 508 can be centrically located relative to the housing 502 and can define a central longitudinal axis X5.

The first housing 503*a* can comprise or define a plurality of retaining cavities 510*a* and 510*b* formed through the first housing 503*a* generally in the same direction, or parallel to, the central longitudinal axis X5. The retaining cavities 510*a* and 510*b* can each comprise a respective support opening (see respective support openings 512*a* and 512*b*) in fluid communication with the cleaning chamber 508 when the cleaning elements 504*a* and 504*b* are removed from the cleaning tool. The support openings 512*a* and 512*b* can be formed as bores or openings through the first housing 503*a* for supporting respective cleaning elements 504*a* and 504*b*, as detailed below.

As shown, the cleaning elements 504*a* and 504*b* can comprise respective shafts 516*a* and 516*b*, and respective cleaning members 518*a* and 518*b* (e.g., wire bristles) supported at upper ends of the shafts 516*a* and 516*b*. The lower ends of the shafts 516*a* and 516*b* can be received through and supported by respective support openings 512*a* and 512*b*. The shafts 516*a* and 516*b* can be somewhat compliant (e.g., thin metal, plastic, etc.), so that upper ends of the shafts 516*a* and 516*b* are able to deflect. In one example, as shown, the shafts 516*a* and 516*b* are caused to deflect inwardly when acted upon by a tapered wall section 513 of the second housing 503*b* when it is threadably onto the first housing 503*a*. This is illustrated when comparing FIGS. 13 and 14, where FIG. 14 shows the housing 502 in a first position, such that the second housing 503*b* is situated further away from the first housing 503*a*, as compared to FIG. 13 (due to a user unthreading the first and second housings). Thus, upon rotating the second housing 503*b* relative to the first housing 503*a*, the tapered wall section 513 moves toward the cleaning elements 504*a* and 504*b* and impacts them, thereby applying a force or a greater force to them, and thus pushing inwardly the upper ends of the cleaning elements 504*a* and 504*b* and deflecting them and the respective shafts 516*a* and 516*b* supporting them. This effectively reduces the cleaning area defined by the cleaning elements 504*a* and 504*b* to accommodate different sizes/diameters of fasteners to be cleaned, for instance. The cleaning tool 500 is configured such that the cleaning elements are caused to elastically deflect, meaning that no permanent bending is caused and that the cleaning elements are able to return to an initial position. Therefore, the second housing 503*b* can be moved in the opposite direction, thereby relieving the applied force and resulting strain on the upper ends of the cleaning elements 504*a* and 504*b* so that they can automatically return to a nominal/straighter position, thereby increasing the cleaning area to accommodate a larger size/diameter fastener, for instance. Preferably, four cleaning elements can be incorporated to better surround a particular fastener for cleaning. Alternatively, a guide tool (not shown) can be in provided inside of the second housing 503*b* that forces the cleaning elements 504*a* and 504*b* inwardly during rotation of the cleaning tool 500.

Upon insertion of a fastener to be cleaned within the cleaning chamber 508, the first and second housings 503*a* and 503*b* can be strategically positioned relative to one another (i.e., dialed in or tuned) to apply a specific amount of pressure from the cleaning elements 504*a* and 504*b* onto the fastener. Thus, the cleaning pressure applied to the fastener can be varied as needed. For example, the cleaning pressure can be increased in cases of particularly stubborn residual bonding adhesive or other debris on the fastener. The cleaning pressure can be varied simply by moving the first and second housings relative to one another to increase or decrease the degree of flex or deflection imparted to the cleaning elements 504*a*, 504*b*.

The cleaning tool 500 can further comprise a bore and a magnet (not shown) having the same configuration and purpose as described above regarding the examples discussed herein.

A back end 528 of the first housing 503*b* can comprise a rotation interface for facilitating rotation of the housing 502 while cleaning an object, such as a tool bit aperture 532*a* for receiving a tool bit of a rotary tool (e.g., hand tool or power tool) for rotating the housing 502 during cleaning of an object, such as illustrated and further described below regarding FIGS. 17A and 17B. Alternatively, a chuck clamping feature 532*b* can extend from the first housing 503*a* for being received in a chuck of a power drill, for instance. Note that the other cleaning tools exemplified herein can also have a similar chuck clamping feature extending from the housing.

Figure 15:
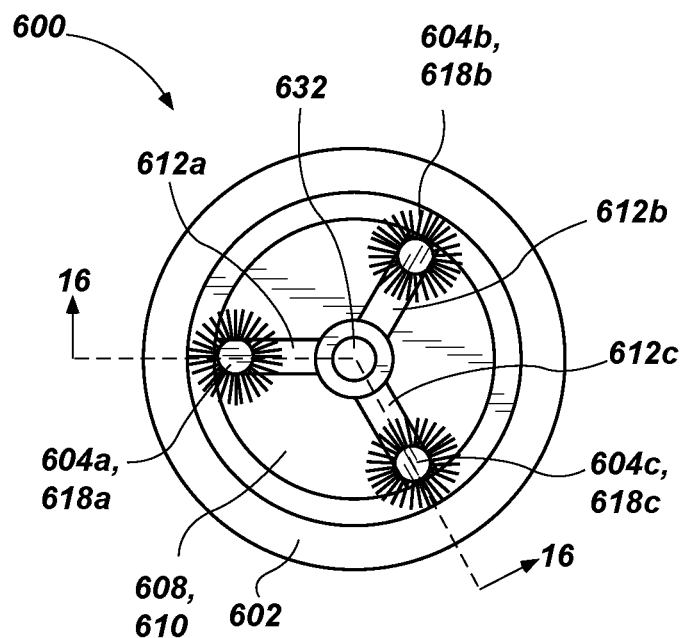
FIG. 15 illustrates a top view of a cleaning tool in accordance with an example of the present disclosure.
Figure 16:
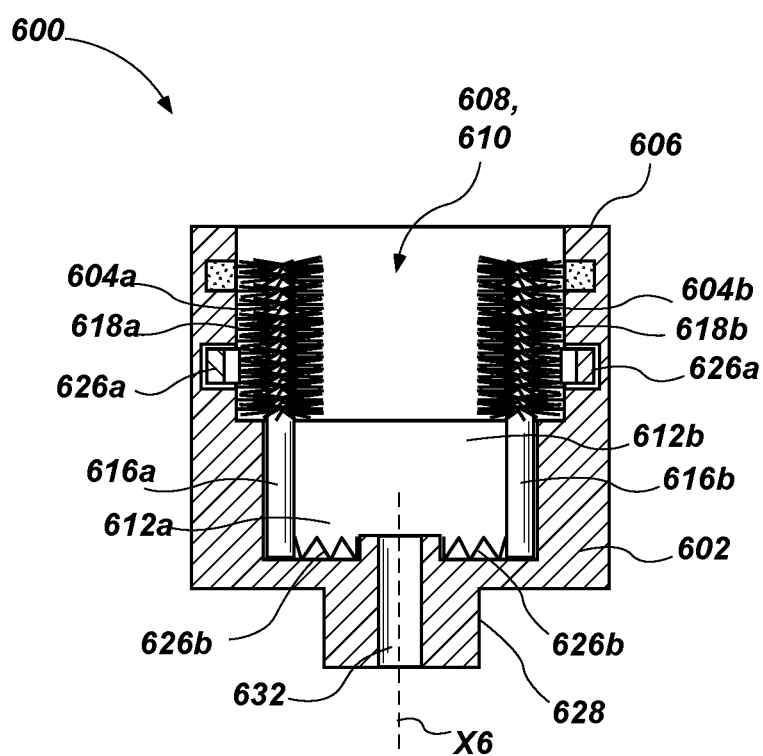
FIG. 16 illustrates a cross sectional view of the cleaning tool of FIG. 16, and taken along lines 16-16.

FIGS. 15 and 16 illustrate a cleaning tool 600 in accordance with an example of the present disclosure. It should be appreciated from the following discussion that the cleaning 600 can operate in many respects similarly as those described above. More specifically, the cleaning tool 600 can comprise a housing 602 configured to receive and support a plurality of cleaning elements 604*a-c*. The housing 602 can comprise an intake end 606 operable to receive the object to be cleaned (see e.g., FIG. 18A). The housing 602 can comprise or define a cleaning chamber 608 extending from the intake end 606 through a portion of the housing 602, and the cleaning chamber 608 can be centrically located through the housing 602 and can define a central longitudinal axis X6. The housing 602 can further comprise or define a retaining cavity 610 formed through the housing 602 generally in the same direction as, or parallel to, the central longitudinal axis X6. The retaining cavity 610 can be a generally cylindrical area or cavity that retains the cleaning members (e.g., bristles) of the cleaning elements 604a-c. Thus, the cleaning chamber 608 can also be defined by the retaining cavity 610. A plurality of support openings 612a-c, formed as rectangular slots, can be in fluid communication with the retaining cavity 610 and consequently with each other.

As shown, the cleaning elements 604a-c can comprise respective shafts 616a-c and respective cleaning members 618a-c (e.g., wire bristles) supported at upper ends of the shafts 616a-c. The lower ends of the shafts 616a-c can be received through and supported by respective support openings 612a-c. The cleaning members 618a-c can comprise a circular or 360 degree bristle arrangement, although other bristle arrangements are possible. Although not spiraled (like FIG. 3), inner portions of the cleaning members 618a-c can engage with the threads of the fastener in a manner that the cleaning members 618a-c somewhat flex or bend, so that they can be automatically threaded along the threads of the fastener during rotation of the housing 602. In turn, this automatically axially translates or axially draws the cleaning tool 600 relative to and along the fastener, similarly as described regarding FIGS. 17A and 17B.

The cleaning tool 600 can comprise a plurality of biasing mechanisms, such as a plurality of upper biasing mechanisms 626a and a plurality of lower biasing mechanisms 626b, such as elastic elements, springs, etc. (only four shown), coupled to or supported by the housing 602 and operable to apply a radial compression force to the respective cleaning elements 604a-c to accommodate different sizes/diameters of fasteners or objects. More specifically, each upper biasing mechanisms 626a can be disposed laterally through openings of the housing 602, such that free ends of the biasing mechanisms 626a (e.g., elastic elements) can extend inwardly to bias respective cleaning members 618a-c (e.g., bristles) inwardly toward the central longitudinal axis X6. The lower biasing mechanisms 626b (e.g., coil springs) can be situated or seated against respective flanges of the housing 604, and the free ends of the lower biasing mechanisms 626b can be biased against lower ends of the shafts 616a-c to outwardly push the shafts 616a-c to place the cleaning elements 604a-c in a nominal position against the housing 602, as shown in FIG. 16. Therefore, when a larger diameter fastener is received through the cleaning chamber 608, it can automatically push outwardly and radially the cleaning elements 604a-c due to the compliant nature of the upper elastic elements 626a the cooperatively and collectively compress to increase the lateral cleaning area defined by the cleaning elements 604a-c.

A back end 628 of the housing 602 can comprise a rotation interface for facilitating rotation of the housing 602 while cleaning an object. In one example, the rotation interface can comprise a knurled or friction surface (e.g., 130 of FIG. 1) formed about an outer surface of the housing 602 for gripping with a hand and rotating the housing 602. Another example of a rotation interface comprises a tool bit aperture 632 (e.g., 132 of FIG. 2) formed centrally through the housing 602 at the back end 628 for receiving a tool bit of a rotary tool (e.g., hand tool or power tool) for rotating the housing 602 during cleaning of an object, such as illustrated and further described below regarding FIGS. 17A and 17B.

Figure 17B:
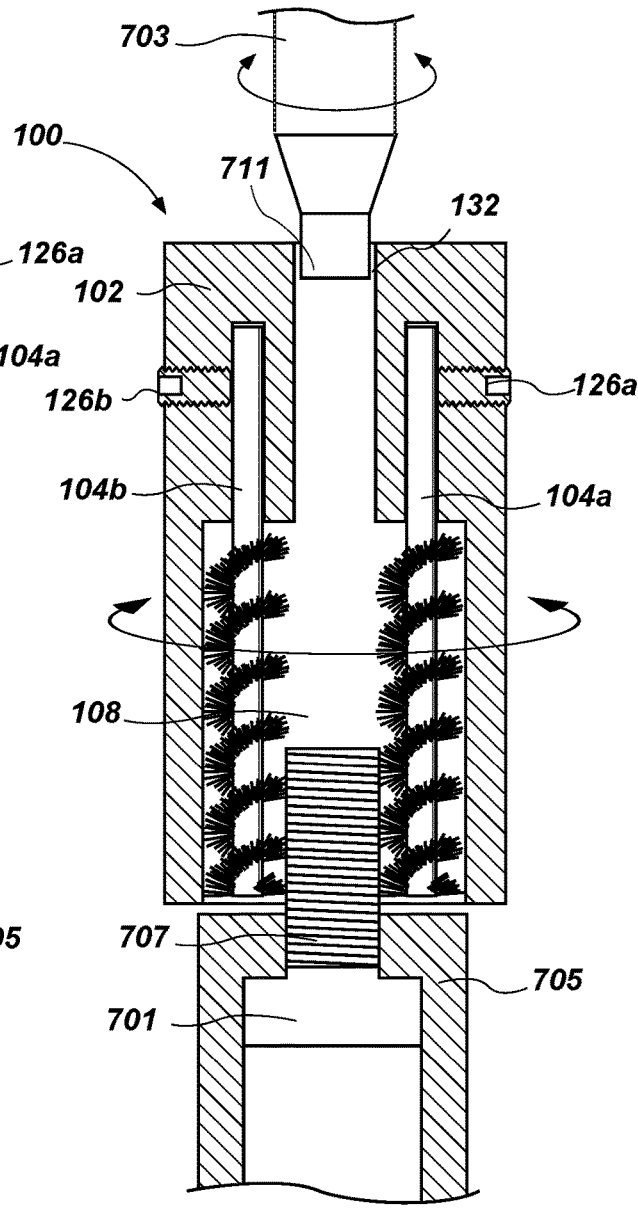
FIG. 17B illustrates the cleaning tool of FIG. 17B in a second position during cleaning of the fastener.

FIGS. 17A and 17B illustrate a method and operation of using a cleaning tool 100 to clean a fastener 701 in accordance with an example of the present disclosure. The cleaning tool 100 can be coupled to a hand tool 703 (e.g., hand or power drill) via a tool bit 711 (hex driver bit) interfaced with the tool bit aperture 132 formed into the housing 102 for rotating the cleaning tool 100. The fastener 701 can be captured within a structure 705, such as a piece of hardware, missile bracket/shim, fuselage, etc., while a threaded shaft 707 of the fastener 701 extends outwardly from the structure 705. In this configuration, it is not feasible or desirable to remove the fastener 701 from the structure 705 for cleaning. Thus, the threaded shaft 707 of the fastener 701 must be cleaned in the captured position shown. Accordingly, the threaded shaft 707 can be at least partially inserted into the cleaning chamber 108 of the housing 102 through the intake end 106, such that one or more of the cleaning members 104a-c (bristle tips) contact the threaded shaft 707 of the fastener 701. The cleaning tool 100 can then rotated by operating the hand tool 703 (or by grabbing a knurled outer surface of the housing 102, and rotating manually), thereby rotating the cleaning elements 104a-c around and about the threaded shaft 707. Thus, the wire bristles, for instance, of the cleaning elements 104a-c will sweep rotationally around the threaded shaft 707 in numerous successive passes as the housing 102 is rotated.

Note that certain components shown in FIGS. 17A and 17B do not have cross sectional lines for purposes of illustration clarity, such as the fastener heads, the hand tool and bit, and the cleaning elements 104a and 104b.

Accordingly, the cleaning chamber 108 can provide a translational cleaning path oriented along the central longitudinal axis X1 (FIG. 3) of the cleaning tool 100, which path is defined by the relative translational movement between the cleaning tool 100 and the fastener 701 being cleaned. This translational cleaning path is followed as the fastener 701 being cleaned is inserted and removed from the cleaning chamber 108 in successive back and forth axial movements of the cleaning tool 100 about the fastener 701. The cleaning tool 100 also provides a rotational cleaning path oriented along various lateral axes of the cleaning tool 100, defined by the rotational movement of the cleaning elements 104a-c relative to the threaded shaft 707 of the fastener 701.

As introduced above regarding FIGS. 1-3, rotation of the cleaning tool and engagement of the cleaning members with the threaded shaft of the fastener facilitates advancement of the cleaning tool in an axial direction along the fastener 701. Due to the arrangement of the cleaning members, the threads on the threaded shaft 707, or both of these, the cleaning elements 104a-c somewhat act collectively as a threaded component or device that can engage with the threaded shaft 707 when the cleaning tool 100 is rotated, so that the cleaning tool 100 is automatically drawn downwardly along the threaded shaft 707 when the cleaning tool 100 is rotated in a clockwise direction (assuming the threaded shaft 707 has right-handed threads). Once the cleaning tool 100 has "bottomed-out" or reached its limit of axial movement down onto the fastener 701 and structure 705, the housing 102 can continually be rotated in the same clockwise direction while the user pulls upwardly on the cleaning tool 100, which somewhat moves the bristles in the opposite direction as the threads of the threaded shaft 707, which promotes a more aggressive cleaning operation when drawing the cleaning tool 100 away from the fastener.

It should be appreciated that the various examples discussed above could incorporate only one cleaning element (e.g., 104a) with a particular cleaning tool, and still achieve some level of functionality of efficiently cleaning debris from an object as the single cleaning element sweeps the fasteners while the cleaning tool is rotated. Likewise, a plurality, such as two, three, four, or more than four cleaning elements, could be incorporated with some or all of the examples discussed above, which could provide a quicker, more efficient means of cleaning an object.

The variety of examples of cleaning tools or devices that can be used to remove both structural bonding adhesive and any debris from fasteners can drastically reduce the time and labor required to clean fasteners and other objects by hand, which can therefore reduce overall maintenance or repair times of the systems or devices or objects in which the fasteners are employed.

A method of making a cleaning tool (e.g., 100) can comprise forming a housing having a cleaning chamber (e.g., 108) and a plurality of retaining cavities (e.g., 110a-c). The method can further comprise securing one or more cleaning elements (e.g., 104a-c) to the housing to be supported within the retaining cavities. The method can further comprise securing the cleaning elements with biasing mechanisms (e.g., set screws). Alternatively, the method can comprise coupling a plurality of elastic elements to the housing to bias respective cleaning elements inwardly to accommodate cleaning different sized objects or fasteners.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A cleaning tool for cleaning an object, comprising:
   a housing comprising an intake end and a back end, the housing operable to be rotated by hand or by a hand tool;
   a cleaning chamber formed in the housing;
   a retaining cavity formed in the housing and in fluid communication with the cleaning chamber;
   a cleaning element supported by the retaining cavity, such that a portion of the cleaning element extends into the cleaning chamber for cleaning an object upon rotation of the housing relative to the object; and
   a magnet supported by the housing and positioned adjacent the cleaning chamber to magnetically attract debris during a cleaning process of the object.

2. The cleaning tool of claim 1, further comprising a plurality of retaining cavities formed through the housing, each retaining cavity in fluid communication with the cleaning chamber, the cleaning tool further comprising a plurality of cleaning elements supported by respective retaining cavities, wherein a portion of each cleaning element extends into the cleaning chamber.

3. The cleaning tool of claim 2, wherein each cleaning element comprises a shaft and a plurality of bristles supported by the shaft, and wherein each shaft is received through a support opening of each retaining cavity of the housing for supporting the respective cleaning element.

4. The cleaning tool of claim 3, wherein the bristles of each cleaning element comprises a spiral bristle arrangement, such that rotation of the cleaning tool facilitates each spiral bristle arrangement threadably advancing the cleaning elements along a threaded portion of the object while being cleaned.

5. The cleaning tool of claim 3, wherein the bristles of each cleaning element comprises a linear bristle arrangement situated on one side of the shaft and extending inwardly toward a central longitudinal axis of the cleaning chamber.

6. The cleaning tool of claim 3, wherein the bristles of each cleaning element comprise first and second linear bristle arrangements situated on opposing sides of the shaft, wherein the first linear bristle arrangement extends inwardly toward a central longitudinal axis of the cleaning chamber.

7. The cleaning tool of claim 6, wherein the retaining cavities comprise a slotted configuration extending from the cleaning chamber to a perimeter of the housing, and wherein the second linear bristles extend beyond the perimeter of the housing, such that they are exposed outside of the housing.

8. The cleaning tool of claim 2, further comprising a biasing mechanism coupled to the housing and operable to apply a radial compression force to the cleaning element.

9. The cleaning tool of claim 8, wherein the biasing mechanism comprises an elastic element seated against the housing and biased to the cleaning element.

10. The cleaning tool of claim 2, wherein each retaining cavity is arranged equidistance from one another around the cleaning chamber.

11. The cleaning tool of claim 1, wherein the back end comprises a drive device interface operable to interface with a hand tool.

12. The cleaning tool of claim 1, wherein the cleaning element is radially movable relative to the housing to accommodate cleaning objects of different sizes.

13. The cleaning tool of claim 1, wherein the housing comprises:
a first housing; and
a second housing coupleable to the first housing.

14. The cleaning tool of claim 13, wherein the first and second housings are moveable relative to one another along a longitudinal axis.

15. The cleaning tool of claim 14, wherein the cleaning element is compliant, and wherein the second housing comprises a tapered wall section operable to engage the cleaning element, such that movement of the first housing relative to the second housing operates to apply a force to the cleaning element to cause the cleaning element to deflect inwardly, thereby varying a potential cleaning pressure to be applied by the cleaning tool.

16. A cleaning tool for cleaning an object, comprising:
a housing comprising an intake end and a back end, the housing operable to be rotated by hand or by a hand tool;
a cleaning chamber formed in the housing;
a plurality of retaining cavities formed in the housing, each retaining cavity in fluid communication with the cleaning chamber, and comprising a support opening;
a plurality of cleaning elements supported by respective retaining cavities, wherein a portion of each cleaning element extends into the cleaning chamber for cleaning an object upon rotation of the housing relative to the object, wherein each cleaning element comprises a shaft and a plurality of bristles supported by the shaft, and wherein the shaft of each of the cleaning elements is received through the support opening of a respective one of the plurality of retaining cavities of the housing for supporting the respective cleaning element,
wherein the bristles of each cleaning element comprises a spiral bristle arrangement, such that rotation of the cleaning tool facilitates each spiral bristle arrangement threadably advancing the cleaning elements along a threaded portion of the object while being cleaned.

17. A fastener cleaning system for cleaning a portion of a fastener, comprising:
a structure;
a fastener captured by the structure and having a threaded shaft extending from the structure; and
a cleaning tool comprising:
a housing operable to be rotated by hand or by a hand tool;
a cleaning chamber formed in the housing for receiving the threaded shaft of the fastener;
a retaining cavity formed in the housing and in fluid communication with the cleaning chamber; and
a cleaning element supported by the retaining cavity, such that a portion of the cleaning element extends into the cleaning chamber; and
a magnet supported by the housing and positioned adjacent the cleaning chamber to magnetically attract debris during a cleaning process of the object,
wherein, the threaded shaft contacts the cleaning element upon the threaded shaft being inserted into the cleaning chamber, wherein rotation of the cleaning tool causes the cleaning element to rotatably move relative to the fastener to remove debris from the threaded shaft of the fastener.

18. The fastener cleaning system of claim 17, wherein the cleaning tool further comprises an elastic element coupled to the housing and operable to apply a biasing force to the cleaning element in a radial direction relative to a central longitudinal axis of the cleaning chamber to accommodate different sizes of fasteners to be cleaned.

19. The fastener cleaning system of claim 17, wherein the cleaning tool further comprises a plurality of retaining cavities formed through the housing, each retaining cavity in fluid communication with the cleaning chamber, the cleaning tool further comprising a plurality of cleaning elements supported by respective retaining cavities, wherein a portion of each cleaning element extends into the cleaning chamber.

20. The fastener cleaning system of claim 17, wherein the cleaning element comprises a shaft and a plurality of cleaning members supported by the shaft for engaging with the threaded shaft, wherein rotation of the cleaning tool and engagement of the cleaning members with the threaded shaft of the fastener facilitates advancement of the cleaning tool in an axial direction along the fastener while being be cleaned.

21. A method of cleaning a portion of an object with a cleaning tool, the method comprising:
inserting a portion of an object into a cleaning chamber of the cleaning tool having at least one cleaning element at least partially extending into the cleaning chamber;
rotating the cleaning tool relative to the object by hand or with a hand tool to clean a surface of the object with the at least one cleaning element; and
removing a magnet from the cleaning tool to facilitate removal of ferromagnetic debris collected about the cleaning tool via the magnet during cleaning the object.

22. The method of claim 21, further comprising facilitating adjusting a radial position of the at least one cleaning element via an elastic element biasing the at least one cleaning element relative to the cleaning chamber.

23. The method of claim 21, further comprising moving the cleaning tool relative to the object in successive opposing axial directions.

24. The method of claim 21, wherein the housing supports a plurality of cleaning elements each comprising a spiral bristle arrangement, and wherein the object comprises a threaded fastener, and wherein rotating the cleaning tool relative to the object causes the spiral bristle arrangement to engage with threads of the threaded fastener to automatically axially translate the cleaning tool relative to the object.

25. A method of cleaning a portion of an object with a cleaning tool, the method comprising:
- inserting a portion of an object into a cleaning chamber of the cleaning tool having a plurality of cleaning elements at least partially extending into the cleaning chamber, each cleaning element comprising a spiral bristle arrangement;
- rotating the cleaning tool relative to the object by hand or with a hand tool to clean a surface of the object with the at least one cleaning element,
- wherein the object comprises a threaded fastener, and wherein rotating the cleaning tool relative to the object causes the spiral bristle arrangement of the plurality of cleaning elements to engage with threads of the threaded fastener to automatically axially translate the cleaning tool relative to the object.

\* \* \* \* \*